United States Patent [19]

White et al.

[11] Patent Number: 5,686,551
[45] Date of Patent: Nov. 11, 1997

[54] HYDROXY ETHER POLYMERS AS THERMOPLASTIC BARRIER RESINS

[75] Inventors: Jerry E. White; H. Craig Silvis; Michael N. Mang; Shari L. Kram, all of Midland, Mich.; Robert E. Hefner, Jr., Lake Jackson, Tex.

[73] Assignee: The Dow Chemical Company, Midland, Mich.

[21] Appl. No.: 179,029

[22] Filed: Jan. 7, 1994

[51] Int. Cl.⁶ .................. C08G 59/10; C08G 59/20; C08G 65/14
[52] U.S. Cl. ............................................ 528/101; 528/406
[58] Field of Search ........................ 528/87, 106, 109, 528/110, 111, 112, 116, 176, 392, 406, 101

[56] References Cited

U.S. PATENT DOCUMENTS

| | | |
|---|---|---|
| 4,647,648 | 3/1987 | Silvis et al. . |
| 5,089,588 | 2/1992 | White et al. . |
| 5,115,075 | 5/1992 | Brennan et al. . |
| 5,134,218 | 7/1992 | Brennan et al. . |
| 5,143,998 | 9/1992 | Brennan et al. . |
| 5,149,768 | 9/1992 | White et al. . |
| 5,164,472 | 11/1992 | White et al. . |
| 5,171,820 | 12/1992 | Mang et al. . |
| 5,218,075 | 6/1993 | Brennan et al. . |
| 5,246,751 | 9/1993 | White et al. . |
| 5,248,360 | 9/1993 | Jones, Jr. et al. .................. 428/1 |
| 5,270,405 | 12/1993 | Earls et al. ..................... 525/481 |

OTHER PUBLICATIONS

Carfagna et al. "Curing Kinetics of liquid crystalline epoxy resins", Liquid Crystals, 1993, 13, No. 4, 571–584 (month unavailable).

Barclay et al. "Mechanical and Magnetic Orientation of Liquid Crstalline Epoxy Networks", Polym. Mater. Sci. Eng. (1990), 63, 387–391 (month unavailable).

Robinson et al. "Novel Liquid Crystalline Thermosets: Microstructural Evolution of an LC Mesophase During the Curing Process", 743–744 Polym. Prepr. 34(2) 1993 (month unavailable).

*Primary Examiner*—Jeffrey C. Mullis

[57] ABSTRACT

Thermoplastic hydroxy ether polymers containing inertly substituted or unsubstituted stilbene and ether linkages in the backbone chain and pendant hydroxyl moieties are prepared by reacting (a) an inertly substituted or unsubstituted dihydroxy-stilbene with (b) a diglycidyl ether and, optionally, (c) a difunctional monomer under conditions sufficient to cause the hydroxyl moieties to react with the epoxy moieties to form ether linkages and pendant hydroxyl moieties. The polymers exhibit excellent oxygen barrier properties and are useful in packaging oxygen-sensitive materials.

27 Claims, No Drawings

HYDROXY ETHER POLYMERS AS THERMOPLASTIC BARRIER RESINS

BACKGROUND OF THE INVENTION

This invention relates to thermoplastic hydroxy ether polymers containing ether linkages and pendant hydroxyl moieties.

Polymers having good barrier to oxygen, i.e., having oxygen transmission rates (OTR) of generally less than 10 $cm^3$-mil/100 $in^2$-atm-day are useful in packaging oxygen-sensitive materials. See, for example, *Encyclopedia of Polymer Science and Technology*, 2nd Edition, Vol. 10, pp. 684–720. While hydroxyphenoxy ether polymers and related materials exhibit very good barrier to oxygen and are therefore useful in packaging oxygen-sensitive materials (Reinking et al, *J. Polym. Sci.*, vol. 7, pp. 2135–2144, pp. 2145–2152 and pp. 2153–2160 (1963)), there is a continuing desire to further reduce the oxygen transmission rates of these polymers.

The present invention is directed to polymers having such reduced oxygen transmission rates.

SUMMARY OF THE INVENTION

The present invention is, in one aspect, a thermoplastic hydroxy ether polymer containing inertly substituted or unsubstituted stilbene and ether linkages in its backbone chain and pendant hydroxyl moieties.

In another aspect, this invention is a process for preparing the thermoplastic hydroxy ether polymer containing inertly substituted or unsubstituted stilbene which comprises (a) reacting an inertly substituted or unsubstituted dihydroxy-stilbene, optionally in combination with other difunctional monomers, with an arylene diglycidyl ether or combination of different arylene diglycidyl ethers or (b) reacting a difunctional monomer or combination of different difunctional monomers with the diglycidyl ether of inertly substituted or unsubstituted dihydroxy-stilbene, optionally in combination with other arylene diglycidyl ethers.

In another aspect, this invention is a container suitable for packaging oxygen-sensitive materials wherein the container is fabricated from the thermoplastic hydroxy ether polymer.

In addition to their use as barrier containers and films, the polymers of this invention are also useful as molding, extrusion and casting resins.

DETAILED DESCRIPTION OF THE INVENTION

As used herein, the term "diglycidyl ether" is meant a compound generally represented by the formula:

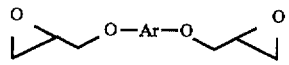

wherein Ar is an aromatic moiety.

As used herein, the term "aromatic moiety" is meant any group having one or more aromatic rings and from 5 to about 25 carbon atoms. The aromatic rings may have one or more non-carbon atoms in the ring such as, for example, sulfur, nitrogen and oxygen, or one or more substituent groups bonded to the aromatic ring. These substituent groups may be alkyl, cycloalkyl, aryl, alkoxy, aryloxy, amido, halo, nitro, or cyano groups.

The term "hydrocarbylene or substituted hydrocarbylene" is meant herein an alkylene or cycloalkylene moiety having from 2 to 20 carbons and optionally containing a heteroatomic group in the chain or substituent thereto.

The term "hydrocarbyl" is meant herein an alkyl or cycloalkyl having from 2 to 20 carbons and optionally containing a heteroatomic moiety. The hydrocarbyl is optionally substituted with alkyl, cycloalkyl, aryl, alkoxy, aryloxy, amido, halo, nitro, hydroxyl or cyano groups.

As used herein, "hydroxyether polymer" is a polymer having ether groups in its backbone chain and pendant hydroxyl groups.

Preferably the hydroxyether polymer of the present invention can be represented by the formula:

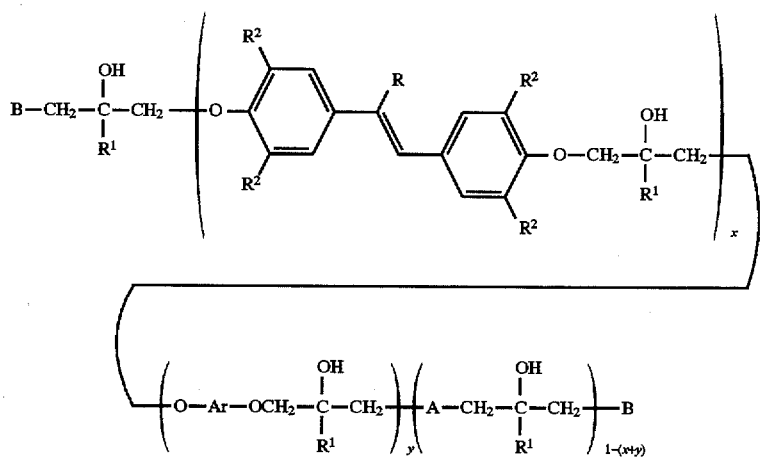

wherein x is from about 0.01 to about 1 and y is from about 0 to about 0.99; $R^1$ is independently hydrogen or a substituted or unsubstituted hydrocarbyl; R and $R^2$ are independently hydrogen, cyano, halo, or a hydrocarbyl; Ar is a divalent aromatic group other than an inertly substituted or unsubstituted dihydroxy-stilbene; A is a linkage represented by any one of the formulae:

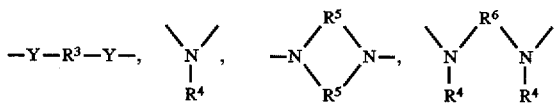

wherein Y is independently a sulfur, an inertly substituted or unsubstituted N-hydrocarbyl sulfonamide, or a carboxyl moiety; $R^3$ is independently an aromatic moiety other than an inertly substituted or unsubstituted stilbene or a hydrocarbylene; R⁴ is independently a hydrocarbyl or an aromatic moiety; R⁵ is independently a hydrocarbylene; and B is a monovalent organic terminating group such as PhO—, PhS, PhSO₂NMe—, (HOCH₂CH₂)₂N—, PhCO₂— and MeCO₂—.

In the more preferred polymers, x is from about 0.25 to about 0.75; y is from about 0.25 to about 0.74; R¹ and R² are hydrogen; Ar is 4,4-biphenylene, 1,3-phenylene, 1,4-phenylene, 4,4'-isopropylidenediphenylene, 4,4'-sulfonyldiphenylene, 4,4'-oxydiphenylene, 4,4'-carbonyldiphenylene, 4,4'-thiodiphenylene, 4,4'-methylenediphenylene, 9,9-flourenediphenylene, N,N'-adipamidediphenylene, 3,3'5,5'-tetrabromoisopropylidenediphenylene, phenolphthalimidine, phenolphthalein, and benzophenone; R³ and R⁶ are independently 4,4'-biphenylene, 1,3-phenylene, 1,4-phenylene, 4,4'-iso-propylidenediphenylene, 4,4'-sulfonyldiphenylene, 4,4'-oxydiphenylene, 4,4'-carbonyldiphenylene, 4,4'-thiodiphenylene, 4,4'-methylenediphenylene, 9,9-flourenediphenylene, N,N'-adipamidediphenylene, 3,3'5,5'-tetrabromoisopropylidenediphenylene, phenolphthalimidine, phenolphthalein, and benzophenone, ethylene, propylene, butylene, pentamethylene, hexamethylene, heptamethylene, octamethylene, nonamethylene, decamethylene, cyclohexylene, oxydiethylene and phenylenedimethylene; R⁴ is 2-hydroxyethyl, 3-hydroxypropyl, 4-hydroxybutyl, 3-hydroxyphenyl, 4-hydroxyphenyl, phenyl, methyl, ethyl, propyl, butyl, phenyl, hexyl, heptyl, octyl, nonyl, decyl, dodecyl, 2-methylamidoethyl, 2-cyanoethyl, 2-methoxyethyl, 2-phenoxyethyl and benzyl; and R⁵ is independently ethylene, methylethylene, or propylene.

The hydroxy ether polymers of the present invention can be prepared by allowing (1) one or more difunctional monomers (monomers having two or more functionalities or groups which can react with an epoxy group) to react with (2) the diglycidyl ether of an inertly substituted or unsubstituted 4,4'-dihydroxy-stilbene and, optionally, (3) other diglycidyl ethers represented by the formula:

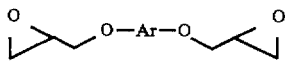

wherein Ar is as defined above.

Difunctional monomers which are advantageously employed in the practice of the present invention for preparing hydroxy ether polymers include monomers having two reactive groups, such as dihydric phenols, dithiols, disulfonamides, dicarboxylic acids, and difunctional amines, aminophenols and aminocarboxylic acids.

Dihydric phenols which can be employed in the practice of the present invention include the bisphenols described in U.S. Pat. Nos. 5,115,075; 4,480,082 and 4,438,254, and in copending U.S. applications Ser. No. 800,340, filed on Nov. 26, 1991, and Ser. No. 884,673, filed on May 18, 1992, all of which are incorporated herein by reference. Preferred dihydric phenols include 4,4'-isopropylidenebisphenol (bisphenol A), 4,4'-sulfonyldiphenol, 4,4'-oxydiphenol, 4,4'-methylenediphenol, 4,4'-thiodiphenol, 9,9-bis(4-hydroxyphenyl)fluorene, 4,4'-biphenol, 4,4'-dihydroxybenzophenone, hydroquinone, resorcinol, N,N'-bis(3-hydroxyphenyl)adipamide, phenolphthalein, phenolphthalimidine and 3,3',5,5'-tetrabromobisphenol A. More preferred dihydric phenols are 4,4'-isopropylidenebisphenol (bisphenol A), 9,9-bis(4-hydroxyphenyl)fluorene, hydroquinone, resorcinol, 4,4'-sulfonyldiphenol, 4,4'-thiodiphenol, 4,4'-oxydiphenol, and 4,4'-biphenol. Most preferred dihydric phenols are 4,4'-isopropylidenebisphenol (bisphenol A), 4,4'-sulfonyldiphenol, 4,4'-oxydiphenol, and 9,9-bis(4-hydroxyphenyl)fluorene.

Dithiols which can be employed in the practice of the present invention include those represented by the formula HS—R⁷—SH, wherein R⁷ is a hydrocarbylene or a divalent aromatic moiety. Preferably, R⁷ is (1) alkylene or cycloalkylene which optionally contains a heteroatomic moiety such as oxygen, sulfur, sulfonyl, or sulfoxyl or (2) arylene which optionally contains a heteroatomic moiety and optionally substituted with alkyl, alkoxy, halo, nitro, cyano or cycloalkyl groups. More preferred dithiols include 1,4-butanedithiol, 1,5-pentanedithiol, mercaptoethyl ether, 1,6-hexanedithiol, and 4,4'-dimercaptodiphenyl ether (DMPE). The most preferred dithiol is DMPE. Dithiols and processes for preparing them are well known. See, for example, U.S. Pat. No. 3,326,981 and Sutter Scrutchfield, *Journal of The American Chemical Society*, Vol. 58, pp. 54, 1936.

Disulfonamides which can be employed in the practice of the present invention include N,N'-dimethyl-1,3-benzenedisulfonamide, N,N'-dimethyl-1,4-benzenedisulfonamide, N,N'-bis(2-hydroxyethyl)-1,3-benzenedisulfonamide, N,N'-bis(2-hydroxyethyl)-1,4-benzenedisulfonamide, N,N'-bis(2-hydroxyethyl)-4,4-biphenyldisulfonamide, N,N'-diphenyl-1,2-benzenedisulfonamide, N,N'-diphenyl-1,3-benzenedisulfonamide, N,N'-1,4-benzenedisulfonamide, N,N'-dimethyl-4,4'-biphenyldisulfonamide, N,N'-dimethyl-4,4'-oxydiphenylenedisulfonamide, N,N'-dimethyl-4,4'-thiodiphenylenedisulfonamide, N,N'-dimethyl-4,4'-methylenediphenylenedisulfonamide, and N,N'-dimethyl-4,4'-sulfonyldiphenylenedisulfonamide. Preferred disulfonamides include N,N'-dimethyl-1,3-benzenedisulfonamide, N,N'-dimethyl-1,4-benzenedisulfonamide, N,N'-bis(2-hydroxyethyl)-1,3-benzenedisulfonamide, N,N'-bis(2-hydroxyethyl)-1,4-benzenedisulfonamide, N,N'-dimethyl-4,4'-biphenyldisulfonamide and N,N'-bis(2-hydroxyethyl)-4,4'-biphenyldisulfonamide. Most preferred disulfonamides include N,N'-dimethyl-1,3-benzenedisulfonamide and N,N'-bis(2-hydroxyethyl)-4,4'-biphenyldisulfonamide.

The disulfonamides are prepared by reactions of primary aliphatic or aromatic amines with bis(chlorosulfonyl) alkanes and arenes. These sulfonamides are described in U.S. Pat. No. 5,149,768, incorporated herein by reference.

Dicarboxylic acids which can be employed in the practice of the present invention include succinic acid, glutaric acid, adipic acid, pimelic acid, suberic acid, sebacic acid, 1,9-nonanedicarboxylic acid, 1,10-decanedicarboxylic acid, 1,4-cyclohexanedicarboxylic acid, oxydiacetic acid, isophthalic acid and terephthalic acid. Preferred diacids include isophthalic acid and terephthalic acid. Most preferred diacid is terephthalic acid.

Difunctional amines which can be employed in the practice of the present invention include amines having two reactive hydrogen atoms such as ethanolamine, propanolamine, 2-aminopropionamide, aniline, 4-hydroxyaniline, anisidine, benzylamine, piperazine, 2,5-dimethylpiperazine and N,N'-dimethyl-1,6-hexamethylene diamine.

Diglycidyl ethers represented by Formula I which can be employed in the practice of the present invention include the diglycidyl ethers of the amide-containing bisphenols such as N,N'-bis(hydroxyphenyl)alkylenedicarboxamides, N,N'-bis(hydroxyphenyl)arylenedicarboxamides, bis (hydroxybenzamido)alkanes or bis(hydroxybenzamido) arenes, N-(hydroxyphenyl)hydroxybenzamides, 2,2-bis (hydroxyphenyl)acetamides, N,N'-bis(3-hydroxyphenyl) glutaramide, N,N'-bis(3-hydroxyphenyl)adipamide, 1,2-bis (4-hydroxybenzamido)ethane, 1,3-bis(4-hydroxybenzamide)benzene, N-(4-hydroxyphenyl)-4-hydroxybenzamide, and 2,2-bis(4-hydroxyphenyl) acetamide, 9,9-bis(4-hydroxyphenyl)fluorene, hydroquinone, resorcinol, 4,4'-sulfonyldiphenol, 4,4'-thiodiphenol, 4,4'-oxydiphenol, 4,4'-dihydroxybenzophenone, tetrabromoisopropylidenebisphenol, dihydroxy dinitrofluorenylidenediphenylene, 4,4'-bisphenol, 4,4'-dihydroxybiphenylene oxide, bis(4-hydroxyphenyl) methane, α,α-bis(4-hydroxyphenyl)ethylbenzene, 2,6-dihydroxynaphthalene and 4,4'-isopropylidene bisphenol (bisphenol A). More preferred diglycidyl ethers are the diglycidyl ethers of 9,9-bis(4-hydroxyphenyl)fluorene, hydroquinone, resorcinol, 4,4'-sulfonyldiphenol, 4,4'-thiodiphenol, 4,4'-oxydiphenol, 4,4'-dihydroxybenzophenone, tetrabromoisopropylidenebisphenol, dihydroxy dinitrofluorenylidenediphenylene, 4,4'-biphenol, 4,4'-dihydroxybiphenylene oxide, bis(4-hydroxyphenyl) methane, α,α-bis(4-hydroxyphenyl)ethylbenzene, 2,6-dihydroxynaphthalene and 4,4'-isopropylidene bisphenol (bisphenol A). Most preferred diglycidyl ethers are the diglycidyl ethers of 4,4'-isopropylidene bisphenol (bisphenol A), 4,4'-sulfonyldiphenol, 4,4'-oxydiphenol, 4,4'-dihydroxybenzophenone, and 9,9-bis(4-hydroxyphenyl) fluorene.

Alternatively, the hydroxy ether polymers of this invention can be prepared by reacting (1) an inertly substituted or unsubstituted 4,4'-dihydroxystilbene with (2) a diglycidyl ether represented by Formula 1 and/or (3) a diglycidyl ether of an inertly substituted or unsubstituted 4,4'-dihydroxystilbene.

The conditions at which the reaction is most advantageously conducted are dependent on a variety of factors, including the specific reactants, solvent, and catalyst employed but, in general, the reaction is conducted under a non-oxidizing atmosphere such as a blanket of nitrogen, preferably at a temperature from about 100° C. to about 190° C. The reaction can be conducted neat (without solvent or other diluents). However, in order to ensure homogeneous reaction mixtures at such temperatures, it is often desirable to use inert organic solvents for the reactants. Examples of suitable solvents include 1-methyl-2-pyrrolidinone (NMP), and ethers or hydroxy ethers such as diglyme, triglyme, diethylene glycol ethyl ether, diethylene glycol methyl ether, dipropylene glycol methyl ether, propylene glycol phenyl ether, propylene glycol methyl ether and tripropylene glycol methyl ether.

Residual epoxy groups are end-capped with monofunctional reactants (compounds having one reactive group) such as carboxylic acids, thiols, monofunctional sulfonamides, secondary amines and monohydric phenols. Preferred monofunctional reactants include acetic acid, benzoic acid, thiophenol, N-methylbenzenesulfonamide, diethanolamine, piperazine, N-(2-hydroxyethyl)piperazine, phenol and tert-butylphenol.

The hydroxy ether polymers are recovered from the reaction mixture by conventional methods. For example, the reaction mixture containing the polymer can be diluted with a suitable solvent such as dimethylformamide, cooled to room temperature, and the polymer isolated by precipitation from a non-solvent such as a 50/50 mixture of methanol and water. The precipitated polymer can then be purified by washing such as by a first wash with fresh 50/50 mixture of methanol and water and then fresh water. The polymer is collected by filtration, washed with a suitable solvent, such as water and then dried.

Films prepared from the hydroxy ether polymer of the present invention generally have oxygen transmission rates (OTR) from about 0.1 to about 4 cc/mil/100 in$^2$/atm/day, at 25° C. and 60% relative humidity (ASTM D-3985); carbon dioxide transmission rates ($CO_2$TR) from about 1.5 to about 35 cc-mil/100 in$^2$-atm-day, at 23° C. and 0% relative humidity and water vapor transmission rates (WVTR) from about 0.7 to about 3.5 cc-mil/100 in$^2$-atm-day, at 38° C. and 90% relative humidity (ASTM F-372).

Films, containers and molded parts can be fabricated from the poly(hydroxy ethers) of the present invention by using conventional fabricating techniques for thermoplastic polymers such as compression molding, injection molding, extrusion, thermoforming, blow molding and solvent casting. During fabrication, the molecules of the polymer can be oriented by methods well known in the art. One such method is described in copending U.S. application Ser. No. 144,982, filed on Oct. 27, 1993, incorporated herein by reference. Orientation is also described in *Plastics Engineering Handbook* of the Society of the Plastics Industry, Inc., 4th Ed., p. 113–115, 182 and 183.

The following working examples are given to illustrate the invention and should not be construed as limiting its scope. Unless otherwise indicated, all parts and percentages are by weight.

EXAMPLES 1–4

A. Preparation of 4,4'-dihydroxy-α-methylstilbene (DHAMS)

Concentrated sulfuric acid (196.2 g, 2.0 mol) is added dropwise to a stirred solution of phenol (1882 g, 20.0 mol), chloroacetone (191.9 g, 2.0 mol) and methylene chloride (2.4 L) cooled to −10° C. in a 5-liter glass reactor equipped with a chilled water condenser and nitrogen purge. The acid is added over a period of about 30 minutes so that the reaction temperature remains between −12° C. and −14° C. After an additional 21 hours at −12° C., the reaction mixture is divided equally into three 2-liter separatory funnels, and the contents of each funnel are washed four times with 500 mL of water and then combined. The combined organic layers (the reaction mixture separated from the wash water) are divided equally into two 4-liter beakers and stirred. Ethanol (250 mL) and water (400 mL) are added to each beaker, and the resulting mixtures are heated to 70° C. and maintained at this temperature until all of the methylene chloride is boiled off. The contents of each beaker is diluted to 3.8 L with water, and stirring is maintained for six hours during which a crystalline slurry forms. Stirring is stopped and the slurry in each beaker is kept at −5° C. for 14 hours. The crystalline product is collected by filtration of each slurry, placed in a 4-L beaker and diluted with 1 L of water. The resulting mixture is heated to 100° C. for 15 minutes and the warm slurry is poured through a fritted glass filter. The crystalline product recovered from the filter is dried at 80° C. at 1 mm Hg to a constant weight of 191.2 g. The structure of the product, 4,4'-dihydroxy-α-methylstilbene (DHAMS) is confirmed by proton NMR and infrared spectroscopy.

B. Preparation of 4,4'-diglycidyloxy-α-methylstilbene (DHAMS-DGE)

A solution of 4.6 g of sodium hydroxide in 18.4 mL of water is added dropwise to a mixture of the DHAMS (10 g), epichlorohydrin (58 mL), isopropanol (62 mL) and water (11 mL) stirred at 65° C. During 45 minutes, 14 mL of the sodium hydroxide solution is added, the addition is stopped and the aqueous phase of the reaction mixture is removed. Addition of the remaining sodium hydroxide solution is completed over 20 minutes and the resulting aqueous phase again is removed. The reaction mixture then is diluted with methyl isobutyl ketone (50 mL) and washed three times with 50-mL portions of water. The reaction mixture then is cooled to 10° C. and the product crystallizes from solution. The crystalline solid (7.5 g) is collected by filtration, washed with cold methyl isobutyl ketone and dried in vacuo at 25° C. for 24 hours. The structure of the product, 4,4'-diglycidyloxy-α-methylstilbene (DHAMS-DGE) is confirmed by proton NMR and infrared spectroscopy. The product can be further purified by conventional column chromatography using a silica gel column and methylene chloride as the eluent. This purified material has an epoxy equivalent weight (eew) of 171.08 determined according to the method of Jay (R. R. Jay, *Anal. Chem.*, vol. 36, 1964, page 667).

C. Preparation of Polymers 1–4

A mechanically stirred mixture of DHAMS (4.073 g, 18.0 mmol), DHAMS-DGE (eew=171.08; 6.306 g, 18.4 mmol) and bis(triphenylphosphoranylidene)ammonium chloride (0.22 g, 0.3 mmol) in propylene glycol phenyl ether (35 mL) is heated at 170° C. under a slow nitrogen flow for 1.5 hours, during which additional solvent (25 mL total) is added in 1 to 3 mL increments periodically in order to maintain efficient stirring as the bulk viscosity of the reaction mixture increases. The resulting solution is diluted to 150 mL with dimethyl formamide (DMF) and allowed to cool to 25° C. The solution is poured into a mixture of 1:1 methanol-water in a Waring Blendor to precipitate a white fibrous solid. This material is stirred in fresh methanol-water for 24 hours and allowed to air-dry for 24 hours. The dried material is taken up in tetrahydrofuran (THF; 100 mL) and again precipitated from methanol-water in a blender. Drying in vacuo at 120° C. gives a white fibrous solid (8.24 g) (Polymer 1 in Table I) with an inherent viscosity (η inh) in DMF (0.5 g/dL, 25° C.) of 1.34 dL/g. The structure of the polymer is confirmed by its proton nuclear magnetic resonance (NMR) spectrum. Properties of the polymer are listed in Table I.

Polymers 2 (η inh =0.60 dL/g), 3 (η inh=0.78 dL/g), and 4 (η inh=0.69 dL/g) which are shown in Table I, are prepared by allowing DHAMS-DGE to polymerize with bisphenol A, 4,4'-oxydiphenol and 4,4'-dihydroxybenzophenone, respectively, under the conditions described above. Properties of the polymers are listed in Table I.

EXAMPLE 5

A mechanically stirred mixture of N,N'-bis(3-hydroxyphenyl)adipamide (5.911 g, 18.0 mmol) and DHAMS-DGE (eew=173.82; 6.258 g, 18.0 mmol) in propylene glycol phenyl ether (15 mL) is heated to 120° C. under a slow nitrogen flow. Ethyltriphenylphosphonium acetate (70% in methanol; 0.25 mL) is added to the resulting solution, and the reaction temperature rises exothermically to 170° C. The stirred reaction then is allowed to cool to 150° C. and kept at that temperature for 1.25 hours, during which additional solvent (20 mL total) is added incrementally to maintain efficient stirring. The solution then is diluted with DMF (35 mL), allowed to cool to 25° C., and added to a mixture of 1:1 methanol-water in a blender to precipitate a fibrous solid, which is stirred in fresh methanol-water for 17 hours. The material is collected, allowed to air dry for 24 hours, taken up in THF (75 mL containing 3 mL of water) and again precipitated from methanol-water. Drying the material in vacuo at 100° C. for 24 hours gives a polymer (Polymer 5, 10.56 g) with η inh of 0.80 dL/g. Properties of the polymer are shown in Table I.

COMPARATIVE EXAMPLES A–D

Polymers A, B, and C, are prepared according to the procedure described in U.S. Pat. No. 5,164,472 and Polymer D is prepared according to the procedure described in U.S. Pat. No. 5,089,588, by allowing commercially available bisphenol A diglycidyl ether (D.E.R™ 332, a product of The Dow Chemical Company) to polymerize with bisphenol A, 4,4'-oxydiphenol, 4,4'-dihydroxybenzophenone and N,N'-bis(3-hydroxyphenyl)adipamide, respectively.

The properties of Polymers A–D are listed in Table I.

TABLE I

| No. | $-Ar^1-$ | $-Ar^2-$ | Tg(Tm), °C. | OTR[a] | $CO_2TR$[b] | WVTR[c] |
|---|---|---|---|---|---|---|
| 1 | (4-methylstilbene group) Me | (4-methylstilbene group) Me | 91(193) | 0.4 | 1.5 | 0.7 |
| A | (bisphenol A group) Me, Me | (bisphenol A group) Me, Me | 100 | 9.0 | 30 | 3.5 |

TABLE I-continued

Structure: $-O\text{-CH}_2\text{-CH(OH)-CH}_2\text{-O-Ar}^1\text{-O-CH}_2\text{-CH(OH)-CH}_2\text{-O-Ar}^2-$

| No. | —Ar$^1$— | —Ar$^2$— | Tg(Tm), °C. | OTR$^a$ | CO$_2$TR$^b$ | WVTR$^c$ |
|---|---|---|---|---|---|---|
| 2 | 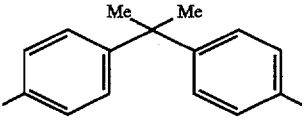 | 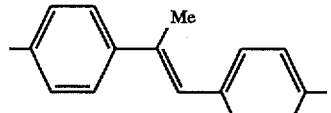 | 81 | 3.9 | 33 | 3.0 |
| 3 | 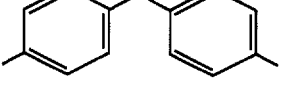 | 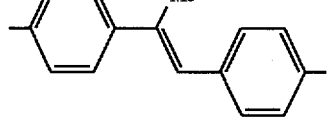 | 73(170) | 1.5 | 13.6 | 2.0 |
| B | 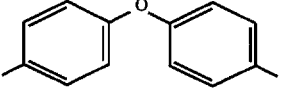 | 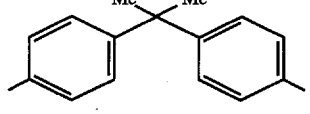 | 88 | 3.7 | ND | ND |
| 4 | 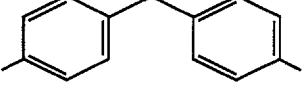 | 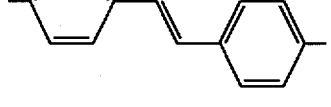 | 104 | 0.9 | 16.7 | 1.5 |
| C | 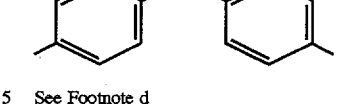 | 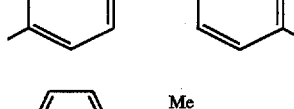 | 98 | 1.62 | ND | ND |
| 5 | See Footnote d | 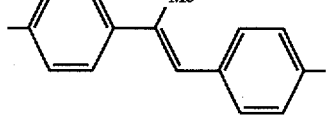 | 80 | 0.5 | ND | ND |
| D | See Footnote d | 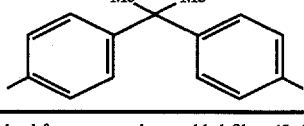 | 103 | 0.8 | ND | ND |

$^a$Reported as cc-mil/100 in$^2$-atm-day and determined for compression molded films (5–10 mil) at 23° C. and 60% relative humidity according to ASTM Method D-3985.
$^b$Reported as cc-mil/100 in$^2$-atm-day and determined for compression molded films (5–10 mil) at 23° C. and 0% relative humidity using a Mocon model C200 carbon dioxide permeability testing apparatus.
$^c$Water vapor transmission rate, reported as g-mil/100$^2$-day and determined for compression molded films (5–10 mil) at 38° C. and 90% relative humidity according to ASTM Method F-372.

$^d$Ar$^1$ is: 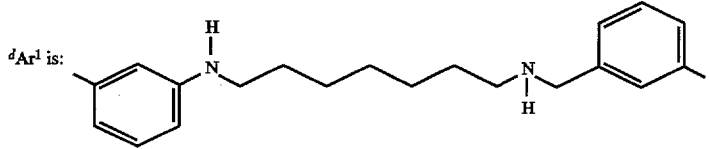

ND = Not determined

The oxygen transmission rates of Polymers A–D are substantially higher than those of Polymers 1–5 prepared from DHAMS-DGE, which indicates that poly(hydroxyethers) containing the DHAMS linkage have superior barrier performance compared with similar polymers derived from conventional diglycidyl ethers, such as bisphenol A diglycidyl ether.

EXAMPLE 6

Bisphenol A (4.109 g, 18.0 mmol), DHAMS (4.073 g, 18.0 mmol) and DHAMS-DGE (eew=171.84; 12.613 g, 6.7 mmol) are allowed to polymerize as in Examples 1–4 to give Polymer 6 (12.99 g) having repeating units represented by the formula:

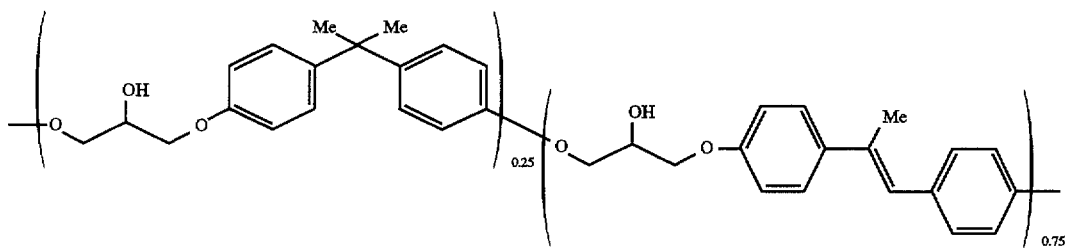

The polymer has an η inh of 0.76 dL/g, a Tg of 84° C. and OTR of 2.4 cc-mil/100 in²-atm-day.

EXAMPLES 7–9

A mechanically stirred mixture of adipic acid (2.631 g, 18.0 mmol), DHAMS-DGE (eew=171.08; 6.159 g, 18.0 mmol) and tetrabutylammonium bromide (0.6 g) in diglyme (25 mL) is heated at 110° C. under a nitrogen atmosphere for 3.25 hours. Acetic acid (2 mL) and additional diglyme (8 mL) are then added to the resulting viscous solution and stirring at 110° C. is continued for an additional 3 hours. The solution is diluted with DMF (15 mL), allowed to cool to 25° C. and poured into 1.5 L of water to give a tough, white solid. The material is cut into small pieces and stirred in fresh water for 24 hours, after which the polymer is collected, allowed to air-dry for 24 hours and taken up in THF (50 mL). The polymer is again precipitated from and washed in water. Drying the polymer in vacuo at 125° C. for 24 hours gives the product poly(hydroxy ester ether) (7.60 g) as a tough, white solid, the structure of which (Polymer 7 in Table II) is confirmed by its proton NMR spectrum.

Polymers 8 (η inh not determined) and 9 (η inh=0.77 dL/g) are prepared by allowing DHAMS-DGE to polymerize with sebacic acid and 1,10-decanedicarboxylic acid, respectively, under the same conditions. The Tg, Tm, OTR, CO2TR, WVTR and structures of polymers 8 and 9 are shown in Table II.

COMPARATIVE EXAMPLES E-F

Following the procedure of U.S. Pat. No. 5,171,820, adipic acid is polymerized with bisphenol A diglycidyl ether to give Polymer E, and hydroquinone diglycidyl ether is polymerized with 1,10-decanedicarboxylic acid to give Polymer F. The OTR of these polymers, as shown in Table II, are substantially higher than those of analogous poly (hydroxy ester ethers) prepared from DHAMS-DGE, which indicates that poly(hydroxy ester ethers) containing DHAMS linkages have superior barrier performance compared with poly(hydroxy ester ethers) containing conventional hydroquinone or bisphenol A segments.

TABLE II $$-O\underset{OH}{\diagdown}O_2C-(CH_2)_n-CO_2\underset{OH}{\diagdown}O-Ar^3-$$

| No | n | —Ar³— | Tg(Tm), °C. | OTR[a] | CO₂TR[b] | WVTR[c] |
|---|---|---|---|---|---|---|
| 7 | 4 | (Me-substituted stilbene) | 44(148) | 0.5 | ND | ND |
| E | 4 | (bisphenol A) | 45 | 2.6 | 15.2 | ND |
| 8 | 8 | (Me-substituted stilbene) | 36(122) | 0.8 | 4.3 | ND |
| 9 | 10 | (Me-substituted stilbene) | 31(136) | 0.6 | 3.3 | 3.3 |

TABLE II-continued

| No | n | —Ar³— | Tg(Tm), °C. | OTR[a] | CO₂TR[b] | WVTR[c] |
|---|---|---|---|---|---|---|
| F | 10 | (para-phenylene) | 3(73) | 10.6 | ND | ND | a) See footnotes to Table 1.
ND = not determined.

EXAMPLE 10

A mechanically stirred mixture of anhydrous piperazine (3,192 g, 37.05 mmol) and DHAMS-DGE (eew=171.08; 12,734 g, 37.05 mmol) in 1'-methyl-2-pyrrolidinone (NMP, 35 mL) is heated to 100° C. under a nitrogen atmosphere. The reaction temperature rises exothermically to 185° C., and the reaction is cooled to 150° C. with an external water bath. The reaction is kept at 150° C. for 45 minutes, during which additional NMP (20 mL total) is added incrementally in order to maintain efficient stirring as the bulk viscosity of the solution increases. N-(2-hydroxyethyl)piperazine then is added and stirring at 150° C. is continued for an additional 30 minutes. The resulting solution is allowed to cool to 100° C., diluted with NMP (20 mL) and poured into 1:1 methanol-water to precipitate fibrous polymer. The polymer is washed with fresh methanol-water and dried in vacuo at 140° C. for 16 hours to give poly(hydroxy amino ether) (Polymer 10, 4.9 g; η inh=0.64 dL/g) represented by repeating units shown in Table III.

Poly(hydroxy amino ether) (Polymer 11, η inh not determined) is prepared identically. Properties of the polymers are shown in Table III.

COMPARATIVE EXAMPLES G–I

Poly(hydroxy amino ethers) G and H are prepared by allowing bisphenol A diglycidyl ether to polymerize with piperazine or ethanolamine according to the procedure described in copending U.S. application Ser. No. 864,975, filed on Apr. 7, 1992. Poly(hydroxy amino ether) I is prepared by allowing hydroquinone diglycidyl ether to polymerize with ethanolamine according to the same procedure. The OTR of Polymers G, H and I, which are shown in Table III, are substantially higher than those of analogous Polymers 10 and 11 containing DHAMS linkages, which indicates that poly(hydroxy amino ethers) 10 and 11 have superior barrier performance compared with poly(hydroxy amino ethers) derived from conventional diglycidyl ethers such as bisphenol A diglycidyl ether and hydroquinone diglycidyl ether.

TABLE III

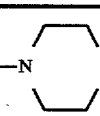

| No | —B— | —Ar⁴— | Tg(Tm), °C. | OTR[a] |
|---|---|---|---|---|
| 10 | piperazine | 4,4'-(1-methylvinylidene)diphenylene | 91(295) | 0.3 |
| G | piperazine | 4,4'-isopropylidenediphenylene | 100 | 1.5 |
| 11 | N-(2-hydroxyethyl)amino | 4,4'-(1-methylvinylidene)diphenylene | (209) | 0.05 |

TABLE III-continued

| | | | |
|---|---|---|---|
| | —O⟨OH⟩—B—⟨OH⟩O—Ar⁴— | | |
| No —B— | —Ar⁴— | Tg(Tm), °C. | OTR[a] |
| H (HN-CH₂CH₂-OH piperazine-like) | bisphenol with Me,Me and p-tolyl groups | 80 | 1.1 |
| I (HN-CH₂CH₂-OH) | p-phenylene | 55 | 0.3 | a) See footnotes to Table 1.

EXAMPLE 12

Using the procedure described in Example 7, piperazine (3.220 g, 37.4 mmol), DHAMS-DGE (6.424 g, 18.7 mmol) and bisphenol A diglycidyl ether (6.381 g, 18.7 mmol) are copolymerized to give 9.2 g of a poly(hydroxy amino ether) having a Tg of 98° C., an η inh of 1.13 dL/g and an OTR of 1.2 cc-mil/100 in²-atm-day. This polymer (Polymer 12) has repeating units represented by the following formula:

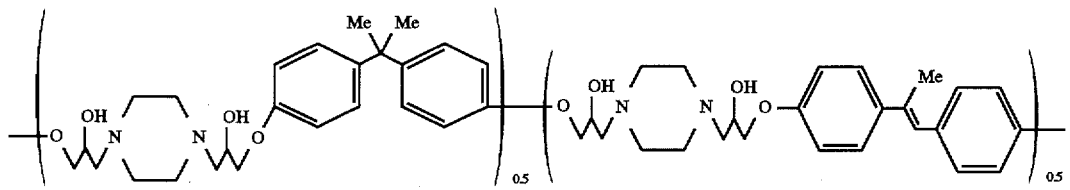

EXAMPLE 13

Using the procedure described in Example 7, ethanolamine (3.292 g, 53.9 mmol), DHAMS-DGE (9.174 g, 26.7 mmol) and bisphenol A diglycidyl ether (9.130 g, 26.7 mmol) are copolymerized to give 18.5 g of a poly(hydroxy amino ether) having a Tg of 76° C., an η inh of 0.77 dL/g and an OTR of 0.11 cc-mil/100 in²-atm-day. This polymer (Polymer 13) has repeating units represented by the formula:

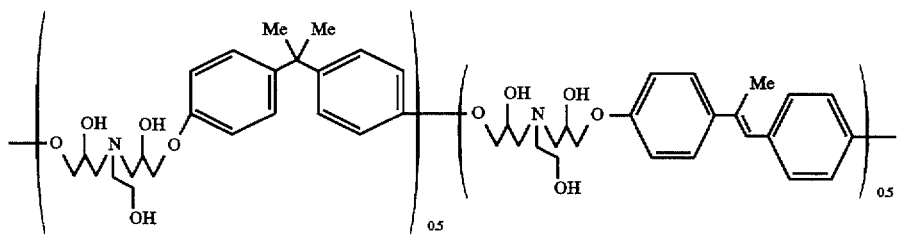

EXAMPLE 14

A mechanically stirred mixture of N,N'-dimethyl-1,6-hexamethylenediamine (2.650 g, 18.0 mmol) and DHAMS- DGE (eew=176.83; 6.366 g, 18.0 mmol) in dipropylene glycol methyl ether (15 mL) is heated at 150° C. under a nitrogen atmosphere for 1.25 hours, during which additional solvent (7 mL total) is added incrementally. Piperidine (1 mL) and additional solvent (10 mL) are added to the resulting solution and heating is continued for 1.75 hours. The reaction solution is poured into water (1.5 L) to precipitate a rubber-like mass that is allowed to stand in the water for 24 hours. The precipitated material is cut into small pieces and stirred in fresh water for 17 hours, collected and dried in vacuo at 25° C. for 24 hours. The material then is taken up in THF (75 mL), reprecipitated from water and dried in vacuo at 95° C. to give 7.15 g of a tough, elastomeric poly(hydroxy amino ether). This polymer (Polymer 14) has a Tg of 27° C., an η inh of 0.54 dL/g and OTR of 4.1 cc-mil-100 in²-atm-day and has repeating units represented by the formula:

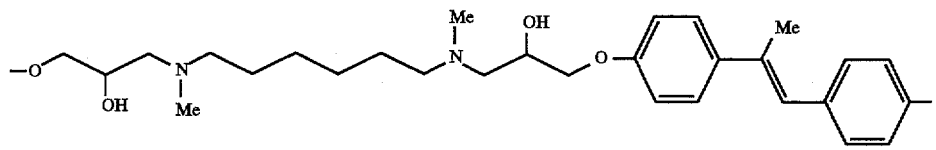

EXAMPLE 15

A mechanically stirred mixture of N,N'-dimethyl-1,3-benzenedisulfonamide (4.758 g, 18.0 mmol) and DHAMS-DGE (eew=171.84; 6.307 g, 18.4 mmol) in propylene glycol phenyl ether (40 mL) is heated to 100° C. under a nitrogen atmosphere. Tetraethylammonium hydroxide (40% in water; 0.5 mL) is added, and the reaction temperature rises exothermically to 150° C. The reaction is maintained at that temperature for 45 minutes, during which additional solvent (20 mL total) is added incrementally. The solution is diluted to 100 mL with DMF, poured through a paint filter to remove traces of gel and added to a mixture of 1:1 methanol-water in a blender to precipitate a white fibrous solid. This material is stirred in fresh methanol-water for 24 hours, collected, air-dried, taken up in DMF (75 mL) and again precipitated from methanol-water. The material is collected and dried in vacuo at 90° C. for 24 hours to give 6.00 g of a white fibrous poly(hydroxy ether sulfonamide) with a Tg of 89° C., an η inh of 1.38 dL/g and OTR of 0.6 cc-mil/100 in²-atm-day. This polymer (Polymer 15) has repeating units represented by the formula:

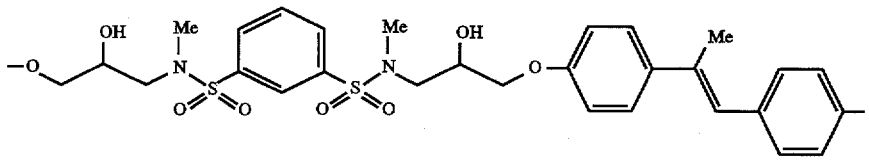

COMPARATIVE EXAMPLE J

A poly(hydroxy ether sulfonamide) is prepared in accordance with the procedure described in U.S. Pat. No. 5,149,768 by polymerizing N,N'-dimethyl-1,3-benzenedisulfonamide and bisphenol A diglycidyl ether. This polymer (Polymer J) has repeating units represented by the formula:

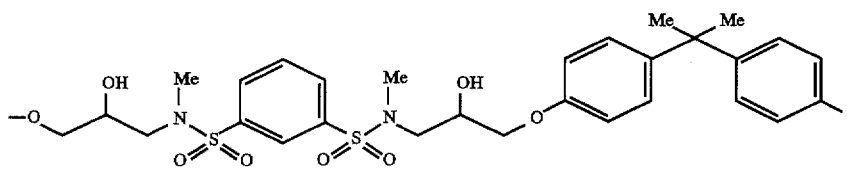

This polymer has OTR of 1.1 cc-mil/100 in²-atm-day. This value is substantially higher than that of the analogous poly(hydroxy ether sulfonamide) prepared using DHAMS-DGE in Example 15, which indicates that poly(hydroxy ether sulfonamides) containing the DHAMS linkage have superior barrier performance compared with analogous polymers derived from conventional diglycidyl ethers, such as bisphenol A diglycidyl ether.

What is claimed is:

1. A thermoplastic polymer having a substituted or unsubstituted stilbene moiety and ether moieties in its backbone chain, pendant hydroxyl moieties, and a monovalent organic terminating group containing no functional group which contains hydrogen active with epoxide groups and which is the residue of an end capper which is monofunctional with respect to epoxy groups selected from the group consisting of carboxylic acids, thiols, monofunctional sulfonamides, secondary amines and monohydric phenols.

2. The polymer of claim 1 represented by the formula:

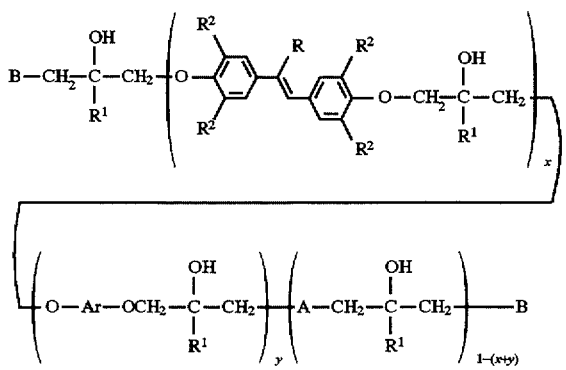

wherein x is a number from about 0.01 to about 1 and y is a number from about 0 to abbut 0.99; $R^1$ is independently hydrogen or a substituted or unsubstituted hydrocarbyl; R and $R^2$ are independently hydrogen, cyano, halo, or a hydrocarbyl; Ar is a divalent aromatic group other than a substituted or unsubstituted stilbene; A is a linkage represented by any one of the formulae:

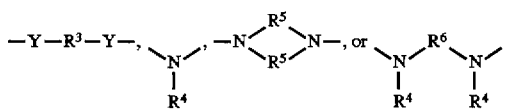

wherein Y is independently a sulfur, a substituted or unsubstituted N-hydrocarbyl sulfonamido, or carboxyl moiety; $R^3$ and $R^6$ are independently an aromatic moiety other than a substituted or unsubstituted stilbene, or a hydrocarbylene; $R^4$ is independently a hydrocarbyl or an aromatic moiety; $R^5$ is a hydrocarbylene; B is a monovalent organic terminating group containing no functional group which contains hydrogen active with epoxide groups and which is the residue of an end capper which is monofunctional with respect to epoxy groups selected from the group consisting of carboxylic acids, thiols, monofunctional sulfonamides, secondary amines and monohydric phenols.

3. The polymer of claim 2 wherein 1−(x+y)=0, R is methyl and $R^1$ and $R^2$ are hydrogen.

4. The polymer of claim 3 wherein x is about 0.5; y is about 0.5; and Ar is 4,4'-isopropylidenediphenylene; 4,4'-sulfonyldiphenylene; 4,4'-carbonyldiphenylene, 4,4'-thiodiphenylene, 1,4-phenylene; 1,3-phenylene/or N,N'-adipamidediphenylene.

5. The polymer of claim 3 wherein x is about 0.75; y is about 0.25; and Ar is 4,4'-isopropylidenediphenylene.

6. The polymer of claim 3 wherein x=1 and y is 0.

7. The polymer of claim 2 wherein x is from about 0.25 to about 0.75, y is from about 0 to about 0.74; R is methyl and $R^1$ and $R^2$ are hydrogen; A is represented by the formula:

$$-Y-R^3-Y-$$

wherein Y is independently a sulfur, a substituted or unsubstituted N-hydrocarbyl sulfonamido, or a carboxyl moiety; and $R^3$ is (1) an alkylene or cycloalkylene moiety having from 2 to 20 carbons, optionally containing a heteroatomic group in the chain or substituent thereto selected from the group consisting of alkyl, cycloalkyl, aryl, alkoxy, aryloxy, halo, amido, nitro, hydroxyl and cyano group; or (2) an arylene other than α-methylstilbene, having from 5 to 25 carbon atoms, optionally containing a heteroatomic moiety or amido backbone linkage(s) in the chain or substituent thereto selected from the group consisting of alkyl, cycloalkyl, aryl, alkoxy, aryloxy, amido, halo, nitro, and cyano group.

8. The polymer of claim 7 wherein x is about 0.5; y is 0, Y is sulfur and $R^3$ is 4,4'-oxydiphenylene.

9. The polymer of claim 7 wherein x is about 0.5; y is 0; Y is N-methylsulfonamido; and $R^3$ is 1,3-phenylene.

10. The polymer of claim 7 wherein x is about 0.5; y is 0; Y is carboxyl; and $R^3$ is ethylene, propylene, butylene, pentamethylene, hexamethylene, heptamethylene, octamethylene, nonamethylene, decamethylene, cyclohexylene, 1,3-phenylene or 1,4-phenylene.

11. The polymer of claim 2 wherein x is from about 0.25 to about 0.75; y is from about 0 to about 0.74; R is methyl and $R^1$ and $R^2$ are hydrogen; and A is represented by the formula:

wherein $R^4$ is (1) alkyl or cycloalkyl having from 2 to 20 carbons, optionally containing a heteroatomic group in the chain or substituent thereto selected from the group consisting of alkyl, cycloalkyl, aryl, alkoxy, aryloxy, amido, halo, nitro, hydroxyl and cyano group; or (2) aryl having from 5 to 25 carbon atoms, optionally containing a heteroatomic moiety or backbone amide linkage(s) in the chain or substituent thereto selected from the group consisting of alkyl, cycloalkyl, aryl, alkoxy, amido, aryloxy, halo, nitro, hydroxyl and cyano group.

12. The polymer of claim 11 wherein x is about 0.5; y=0; and R⁴ is 2-hydroxyethyl.

13. The polymer of claim 11 wherein x is about 0.25; y is about 0.25; R⁴ is 2-hydroxyethyl; and Ar is 4,4'-isopropylidenediphenylene.

14. The polymer of claim 2 wherein x is from about 0.25 to about 0.75; y is from about 0 to about 0.74; R is methyl and R¹ and R² are hydrogen; and A is represented by the formula:

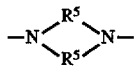

wherein R⁵ is alkylene or cycloalkylene having from 2 to 20 carbons, optionally containing a heteroatomic moiety in the chain or substituent thereto selected from the group consisting of alkyl, cycloalkyl, aryl, alkoxy, aryloxy, halo, amido, nitro, hydroxyl and cyano groups.

15. The polymer of claim 14 wherein x is about 0.5; y=0; and R⁵ is ethylene.

16. The polymer of claim 14 wherein x is about 0.25; y is about 0.25; R⁵ is ethylene and Ar is 4,4'-isopropylidenediphenylene.

17. The polymer of claim 2 wherein x is from about 0.25 to about 0.75; y is from about 0 to about 0.74; R is methyl and R¹ and R² are hydrogen; and A is represented by the formula:

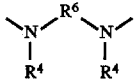

wherein R⁶ is (1) an alkylene or cycloalkylene having from 2 to 20 carbons, optionally containing a heteroatomic moiety in the chain or substituent thereto selected from the group consisting of alkyl, cycloalkyl, aryl, alkoxy, aryloxy, halo, amido, nitro, hydroxyl and cyano groups; or (2) an arylene moiety other than α-methylstilbene having from 5 to 25 carbon atoms, optionally containing a heteroatomic moiety or amido backbone linkage(s) in the chain or substituent thereto selected from the group consisting of alkyl, cycloalkyl, aryl, alkoxy, aryloxy, amido, halo, nitro, and cyano groups; and R⁴ is (1) alkyl or cycloalkyl having from 2 to 20 carbons, optionally containing a heteroatomic group in the chain or substituent thereto selected from the group consisting of alkyl, cycloalkyl, aryl, alkoxy, aryloxy, amido, halo, nitro, hydroxyl and cyano group; or (2) aryl having from 5 to 25 carbon atoms, optionally containing a heteroatomic moiety or backbone amide linkage(s) in the chain or substituent thereto selected from the group consisting of alkyl, cycloalkyl, aryl, alkoxy, amido, aryloxy, halo, nitro, hydroxyl and cyano groups.

18. The polymer of claim 17 wherein x is about 0.5; y is 0; R⁴ is methyl; and R⁶ is hexamethylene.

19. The polymer of claim 2 prepared by reacting (1) one or more difunctional monomers selected from the group consisting of dihydric phenols, dithiols, disulfonamides, dicarboxylic acids and difunctional amines with (2) the diglycidyl ether of a substituted or unsubstituted 4,4'-dihydroxy-stilbene and, optionally, with (3) one or more diglycidyl ethers of the formula:

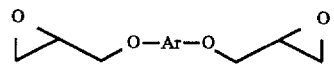

wherein Ar is 4,4-biphenylene, 1,3-phenylene, 1,4-phenylene, 4,4'-isopropylidenediphenylene, 4,4'-sulfonyldiphenylene, 4,4'-oxydiphenylene, 4,4'-carbonyldiphenylene, 4,4'-thiodiphenylene, 4,4'-methylenediphenylene, 9,9-flourenediphenylene, N,N'-adipamidediphenylene, 3,3,'5,5'-tetrabromoisopropylidenediphenylene, phenolphthalimidine, phenolphthalein, or benzophenone.

20. The polymer of claim 2 prepared by reacting (1) a substituted or unsubstituted 4,4'-dihydroxy-stilbene with (2) one or more diglycidyl ethers of the formula:

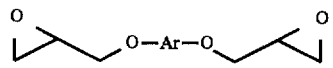

wherein Ar is 4,4-biphenylene, 1,3-phenylene, 1,4-phenylene, 4,4'-isopropylidenediphenylene, 4,4'-sulfonyldiphenylene, 4,4'-oxydiphenylene, 4,4'-carbonyldiphenylene, 4,4'-thiodiphenylene, 4,4'-methylenediphenylene, 9,9-flourenediphenylene, N,N'-adipamidediphenylene, 3,3,'5,5'-tetrabromoisopropylidenediphenylene, phenolphthalimidine, phenolphthalein, or benzophenone and, optionally, with (3) one or more difunctional monomers selected from the group consisting of dihydric phenols, dithiols, disulfonamides, dicarboxylic acids and difunctional amines.

21. The polymer of claim 2 prepared by reacting (1) a substituted or unsubstituted 4,4'-dihydroxy-stilbene with (2) the diglycidyl ether of a substituted or unsubstituted 4,4'-dihydroxy-stilbene and, optionally, with (3) one or more diglycidyl ethers of the formula:

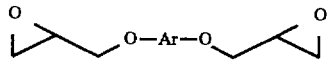

wherein Ar is 4,4-biphenylene, 1,3-phenylene, 1,4-phenylene, 4,4'-isopropylidenediphenylene, 4,4'-sulfonyldiphenylene, 4,4'-oxydiphenylene, 4,4'-carbonyldiphenylene, 4,4'-thiodiphenylene, 4,4'-methylenediphenylene, 9,9-flourenediphenylene, N,N'-adipamidediphenylene, 3,3'5,5'-tetrabromoisopropylidenediphenylene, phenolphthalimidine, phenolphthalein, or benzophenone.

22. The polymer of claim 2 prepared by reacting (1) a substituted or unsubstituted 4,4'-dihydroxy-stilbene, (2) one or more difunctional monomers selected from the group consisting of dihydric phenols, dithiols, disulfonamides, dicarboxylic acids and difunctional amines, (3) the diglycidyl ether of a substituted or unsubstituted 4,4'-dihydroxy-stilbene and (4) one or more diglycidyl ethers of the formula:

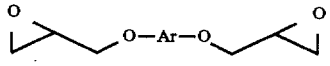

wherein Ar is 4,4-biphenylene, 1,3-phenylene, 1,4-phenylene, 4,4'-isopropylidenediphenylene, 4,4'-sulfonyldiphenylene, 4,4'-oxydiphenylene, 4,4'-carbonyldiphenylene, 4,4'-thiodiphenylene, 4,4'-methylenediphenylene, 9,9-flourenediphenylene, N,N'-adipamidediphenylene, 3,3'5,5'- tetrabromoisopropylidenediphenylene, phenolphthalimidine, phenolphthalein, or benzophenone.

23. The polymer of claim 2 wherein residual epoxy groups are end-capped with a monofunctional reactant.

24. The polymer of claim 23 wherein the monofunctional reactant is selected from the group consisting of diethanolamine, piperidine, N-(2-hydroxyethyl)piperazine, phenol, tert-butyl-phenol, acetic acid, benzoic acid, N-methylbenzene-sulfonamide, or thiophenol.

25. The polymer of claim 1 in the form of a barrier container.

26. The polymer of claim 1 in the form of a barrier film.

27. The polymer of claim 1 in the form of a barrier coating.

* * * * *